United States Patent
Kim et al.

(10) Patent No.: US 10,399,485 B2
(45) Date of Patent: Sep. 3, 2019

(54) DASHBOARD DISPLAY AND CONTROL METHOD THEREOF

(71) Applicant: LG ELECTRONICS INC., Seoul (KR)

(72) Inventors: Sangwon Kim, Seoul (KR); Kyunglack Kim, Seoul (KR); Kihoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/116,356

(22) Filed: Aug. 29, 2018

(65) Prior Publication Data
US 2019/0210519 A1    Jul. 11, 2019

(30) Foreign Application Priority Data
Jan. 5, 2018 (KR) .................. 10-2018-0001939

(51) Int. Cl.
*B60Q 3/18* (2017.01)
*B60K 37/02* (2006.01)
*B60Q 3/14* (2017.01)

(52) U.S. Cl.
CPC .............. *B60Q 3/18* (2017.02); *B60K 37/02* (2013.01); *B60Q 3/14* (2017.02); *B60K 2370/18* (2019.05); *B60K 2370/33* (2019.05); *B60K 2370/349* (2019.05)

(58) Field of Classification Search
None
See application file for complete search history.

(56) References Cited

U.S. PATENT DOCUMENTS

| 7,501,939 B1* | 3/2009 | Belikov | B60K 35/00 340/438 |
| 2009/0272313 A1* | 11/2009 | Ballard | G01D 7/005 116/28 R |
| 2010/0231372 A1* | 9/2010 | Sandstrom | B60K 35/00 340/459 |

FOREIGN PATENT DOCUMENTS

| JP | 2007-218682 A | 8/2007 |
| JP | 2009-168642 A | 7/2009 |
| KR | 10-1998-703014 A | 9/1998 |
| KR | 10-2012-0081614 A | 7/2012 |
| KR | 10-2015-0064466 A | 6/2015 |
| KR | 10-2016-0069034 A | 6/2016 |

* cited by examiner

*Primary Examiner* — Jany Richardson
(74) *Attorney, Agent, or Firm* — Birch, Stewart, Kolasch & Birch, LLP

(57) ABSTRACT

A dashboard display for a vehicle, and including a light source unit including a plurality of light sources disposed in a matrix form; a display unit configured to display speedometer information using light provided from the light source unit; a needle positioned on the speedometer information and rotatably moving according to a speed of the vehicle; and a processor configured to control the light source unit to emit a predetermined brightness in a region at least partially surrounding the needle, and vary the region at least partially surrounding the needle according to a position of the needle.

20 Claims, 15 Drawing Sheets

DASHBOARD DISPLAY AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2018-0001939, filed on Jan. 5, 2018, the contents of which is incorporated by reference herein in its entirety.

BACKGROUND OF THE INVENTION

1. Field of the Invention

The present disclosure relates to a dashboard display guiding a speed of a vehicle and a control method thereof.

2. Background of the Invention

Vehicles refer to a means of transporting people or goods by using kinetic energy. A representative example of vehicles is an automobile. For safety and convenience of users who use vehicles, various sensors and devices are provided in the vehicles, and functions of the vehicle are diversified.

The functions of vehicles may be divided into a convenience function for seeking drivers' convenience and a safety function for seeking safety of drivers and/or pedestrians. First, the convenience function has development motives related to drivers' convenience such as providing an (information+entertainment) function to vehicles, supporting a partial autonomous driving function, or assisting a driver to secure a visual field at night or in a blind spot. For example, the convenience function includes active cruise control (ACC), a smart parking assist system (SPAS), a night vision (NV), a head-up display (HUD), an around view monitor (AVM), an adaptive headlight system (AHS), and the like.

The safety function is a technique of securing driver's safety and/or pedestrian's safety, including a lane departure warning system (LDWS), a lane keeping assist system (LKAS), an autonomous emergency braking (AEB) function, and the like. For the functional support and the enhancement of vehicles, it may be considered to improve structural and/or software parts of a vehicle control device.

Thanks to these improvements, existing analog dashboards have been replaced by digital dashboard displays. Manufacturers can provide unique user interfaces distinguished from other manufacturers using dashboard displays, and more information can be efficiently output in a limited space. User interfaces output on dashboard displays change dynamically and are user-friendly, so drivers can feel more fun and convenience in driving.

In addition, a dashboard display includes one or more needles for guiding various types of information, and each needle is configured to emit predetermined light to provide visibility. For example, each needle may emit light having a predetermined color indirectly through a prism structure or may emit light having a predetermined color directly through a light source such as an LED.

As dashboard displays have become digitized, various types of information displayed below needles are formed by backlight of the dashboard displays, causing a problem in that light output from the needles and light output below the needles overlap. Needles must be clearly distinguished from other information because blurring of light makes boundaries between needles and other information unclear and degrade a drivers' visibility with respect to the needles.

SUMMARY OF THE INVENTION

Therefore, an aspect of the detailed description is to solve the above-mentioned problems and other problems.

Another aspect of the detailed description is to provide a dashboard display that can increase visibility of a needle, and a control method thereof To achieve these and other advantages and in accordance with the purpose of this specification, as embodied and broadly described herein, a dashboard display mounted on a vehicle and a control method thereof are provided. The dashboard display includes: a light source unit in which a plurality of light sources are disposed in a matrix form; a display unit outputting visual information using light provided from the light source unit; a needle positioned on the visual information and rotatably moving to guide a speed of the vehicle; and a processor controlling the light source unit such that a predetermined region of the display unit has predetermined brightness based on a position of the needle, wherein the predetermined region is varied according to a position of the needle.

To achieve these and other advantages and in accordance with the purpose of this specification, as embodied and broadly described herein, a method for controlling a dashboard display in which a plurality of light sources are arranged in a matrix form includes: sensing a position of a needle guiding a speed of a vehicle; and controlling at least one of the light sources such that a predetermined region has predetermined brightness, based on the position of the needle, wherein the predetermined region is varied according to the position of the needle. In addition, the present disclosure includes a vehicle having at least one dashboard display of the embodiments described above.

The embodiments of the present disclosure have one or more effects as follows. According to an embodiment, since a predetermined region surrounding at least a portion of the needle has a predetermined brightness different from the other region, the boundary between the needle and other information is clear. Since the contrast between the needle and other information, visibility of the needle is significantly improved and power consumption of the dashboard display is significantly improved.

According to an embodiment, since the predetermined region is varied according to at least one of acceleration and speed of a vehicle, characteristics of a road on which the vehicle is driving, an RPM, an allowable driving speed range per unit time, and an illumination value, a dynamic interface can be provided to a driver.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
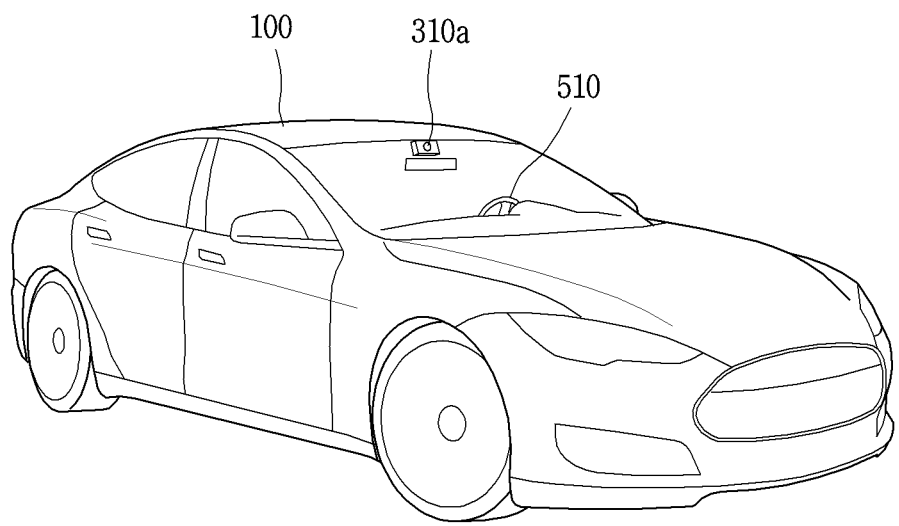
FIG. 1 is a view illustrating an appearance of a vehicle according to an embodiment of the present disclosure.
Figure 1:
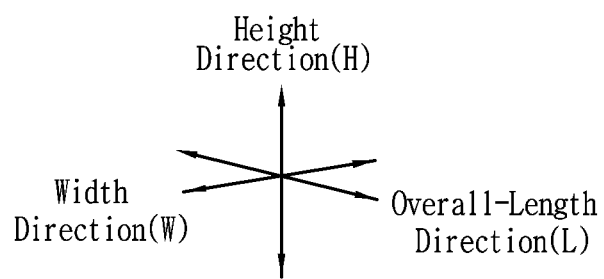
Figure 2:
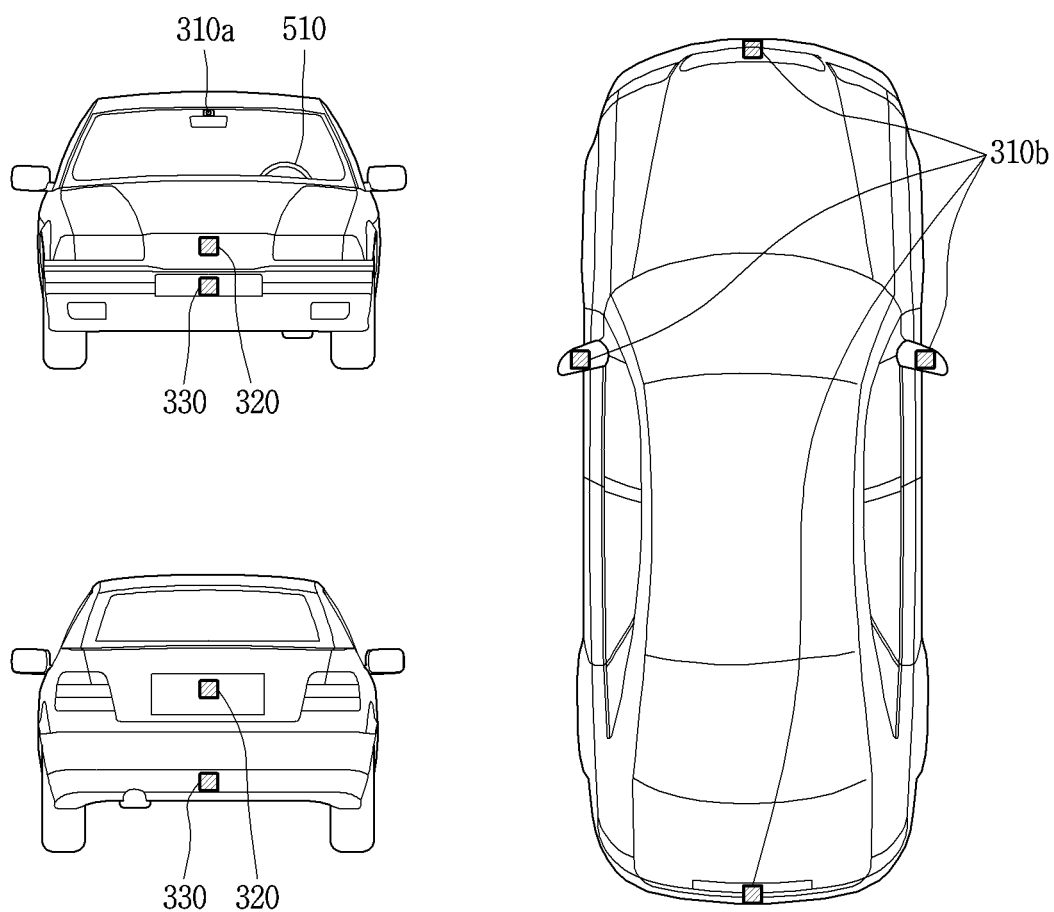
FIG. 2 is a view illustrating a vehicle according to an embodiment of the present disclosure viewed at various angles.
Figure 3:
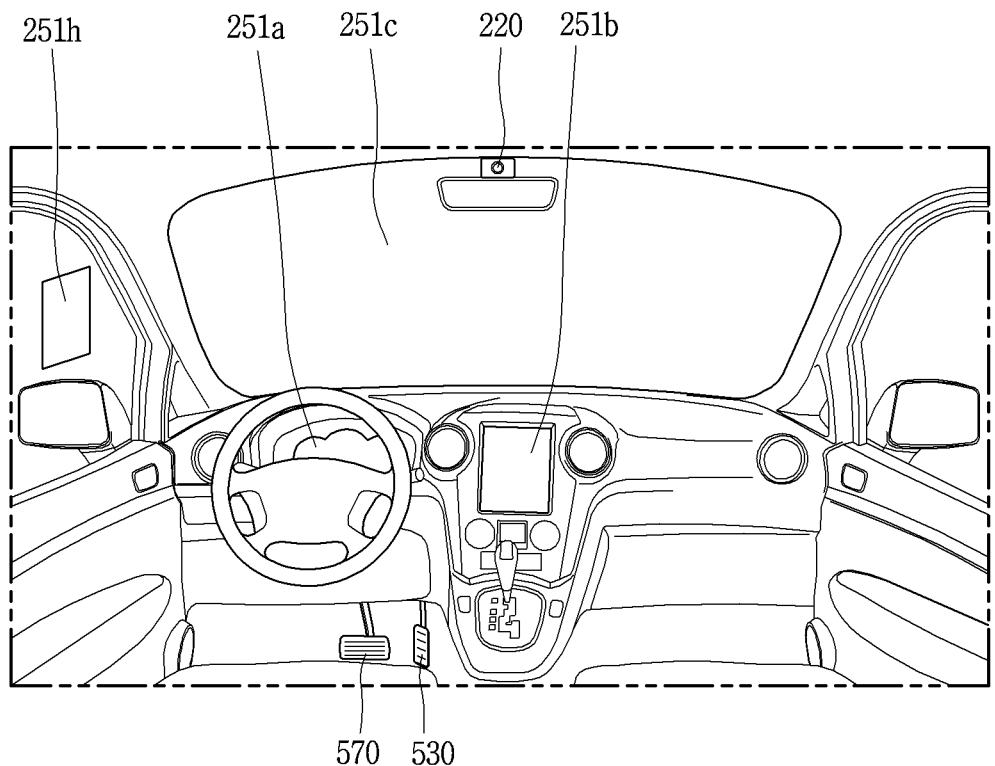
FIGS. 3 and 4 are views illustrating the inside of a vehicle according to an embodiment of the present disclosure.
Figure 4:
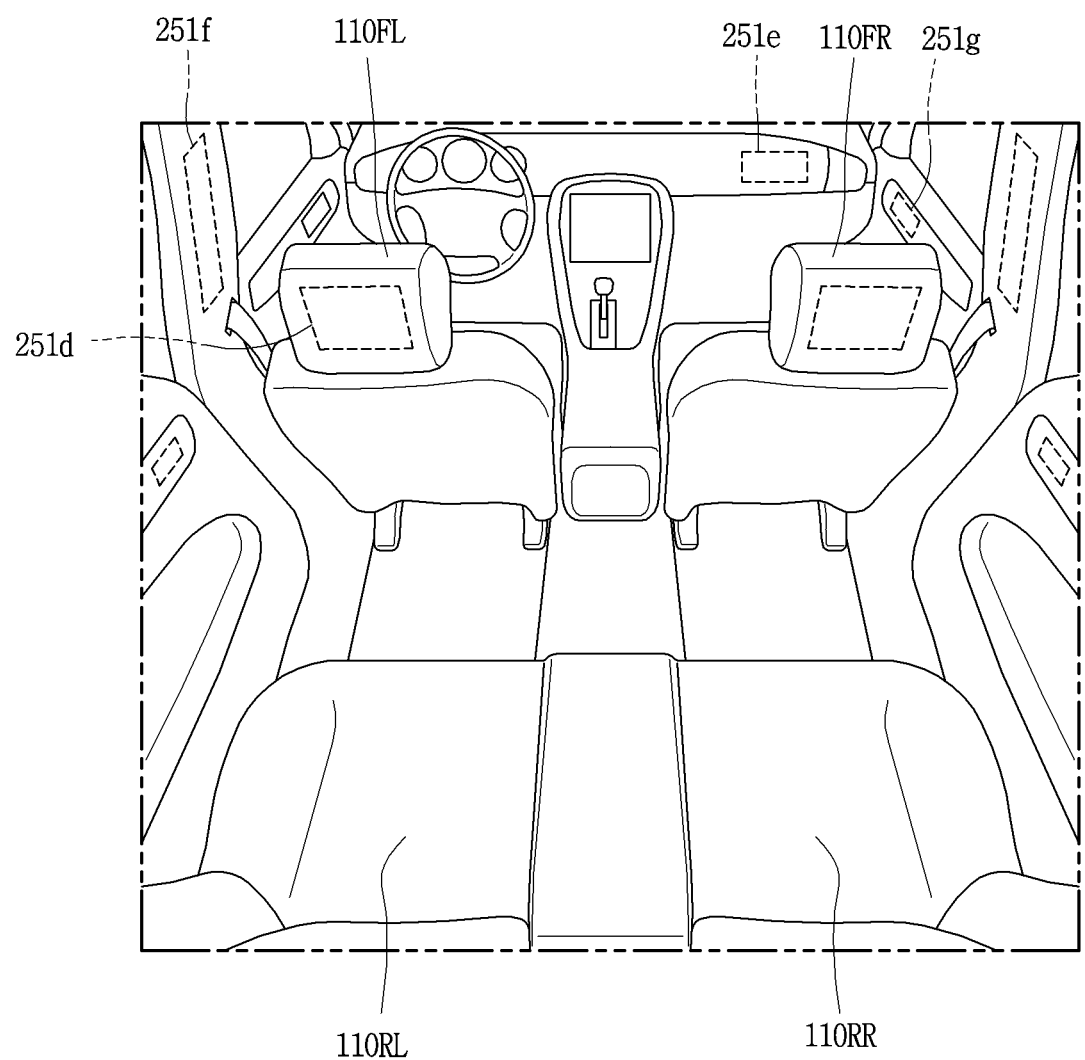

Description will now be given in detail according to exemplary embodiments disclosed herein, with reference to the accompanying drawings. For the sake of brief description with reference to the drawings, the same or equivalent components can be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car. The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

As illustrated in FIGS. 1 to 7, a vehicle 100 includes wheels turning by a driving force, and a steering apparatus 510 for adjusting a driving (ongoing, moving) direction of the vehicle 100. The vehicle 100 may be an autonomous vehicle and can be switched into an autonomous mode or a manual mode based on a user input. For example, the vehicle can be converted from the manual mode into the autonomous mode or from the autonomous mode into the manual mode based on a user input received through a user interface apparatus 200.

The vehicle 100 can be switched into the autonomous mode or the manual mode based on driving environment information. The driving environment information can be generated based on object information provided from an object detecting apparatus 300. For example, the vehicle 100 can be switched from the manual mode into the autonomous mode or from the autonomous module into the manual mode based on driving environment information generated in the object detecting apparatus 300.

In an example, the vehicle 100 can be switched from the manual mode into the autonomous mode or from the autonomous module into the manual mode based on driving environment information received through a communication apparatus 400. The vehicle 100 can also be switched from the manual mode into the autonomous mode or from the autonomous module into the manual mode based on information, data or signal provided from an external device.

When the vehicle 100 is driven in the autonomous mode, the autonomous vehicle 100 can be driven based on an operation system 700. For example, the autonomous vehicle 100 can be driven based on information, data or signal generated in a driving system 710, a parking exit system 740 and a parking system 750. When the vehicle 100 is driven in the manual mode, the autonomous vehicle 100 can receive a user input for driving through a driving control apparatus 500. The vehicle 100 can be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

Figure 7:
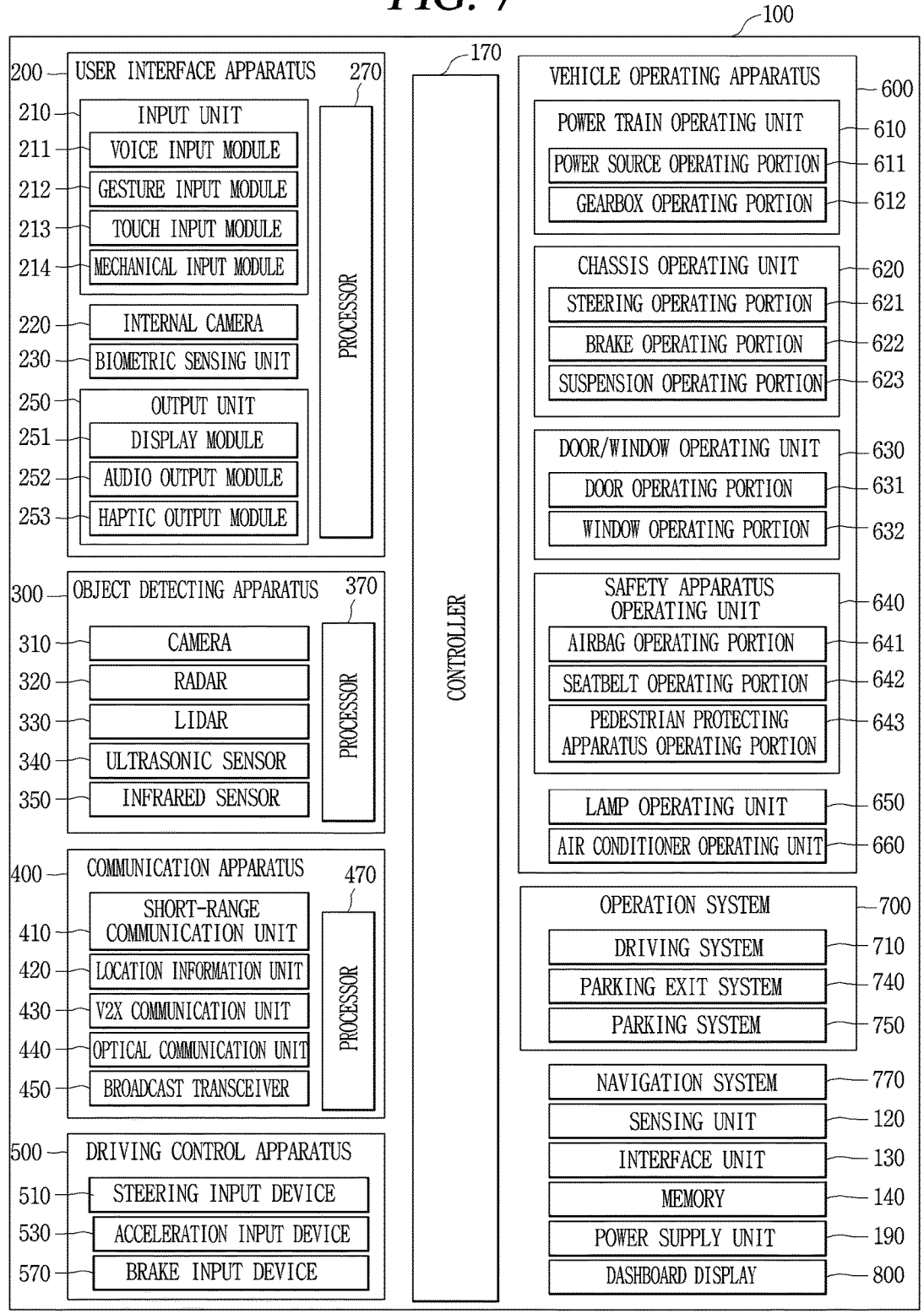
FIG. 7 is a block view referred to in explaining a vehicle according to an embodiment of the present disclosure.

As illustrated in FIG. 7, the vehicle 100 can include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

The vehicle 100 can include more components in addition to components to be explained in this specification or may not include some of those components to be explained in this specification. Further, the user interface apparatus 200 is for communication between the vehicle 100 and a user. The user interface apparatus 200 can receive a user input and provide information generated in the vehicle 100 to the user. The vehicle 200 can also implement user interfaces (UIs) or user experiences (UXs) through the user interface apparatus 200.

In addition, the user interface apparatus 200 may include an input unit 210, an internal camera 220, a biometric sensing unit 230, an output unit 250 and a processor 270. The user interface apparatus 200 may also include more components in addition to components to be explained in this specification or may not include some of those components to be explained in this specification.

Further, the input unit 200 allows the user to input information. Data collected in the input unit 120 can be analyzed by the processor 270 and processed as a user's control command. The input unit 210 can be disposed within the vehicle. For example, the input unit 200 can be disposed on one area of a steering wheel, one area of an instrument panel, one area of a seat, one area of each pillar, one area of a door, one area of a center console, one area of a headlining, one area of a sun visor, one area of a wind shield, one area of a window or the like.

In addition, the input unit 210 may include a voice input module 211, a gesture input module 212, a touch input module 213, and a mechanical input module 214. The audio input module 211 can convert a user's voice input into an electric signal, and the converted electric signal can be provided to the processor 270 or the controller 170.

The voice input module 211 may include at least one microphone. Further the gesture input module 212 can convert a user's gesture input into an electric signal, and the converted electric signal can be provided to the processor 270 or the controller 170. The gesture input module 212 may include at least one of an infrared sensor and an image sensor for detecting the user's gesture input.

The gesture input module 212 can detect a user's three-dimensional (3D) gesture input. Thus, the gesture input module 212 may include a light emitting diode outputting a plurality of infrared rays or a plurality of image sensors. The gesture input module 212 can also detect the user's 3D gesture input by a time of flight (TOF) method, a structured light method or a disparity method.

Further, the touch input module 213 can convert the user's touch input into an electric signal, and the converted electric signal can be provided to the processor 270 or the controller 170. In addition, the touch input module 213 may include a touch sensor for detecting the user's touch input.

The touch input module 213 can be integrated with the display unit 251 so as to implement a touch screen. The touch screen can provide an input interface and an output interface between the vehicle 100 and the user. Further, the mechanical input module 214 may include at least one of a button, a dome switch, a jog wheel and a jog switch. An electric signal generated by the mechanical input module 214 can be provided to the processor 270 or the controller 170. The mechanical input module 214 can also be arranged on a steering wheel, a center fascia, a center console, a cockpit module, a door and the like.

In addition, the internal camera 220 can acquire an internal image of the vehicle. Also, the processor 270 can detect a user's state based on the internal image of the vehicle. The processor 270 can acquire information related to the user's gaze from the internal image of the vehicle and detect a user gesture from the internal image of the vehicle.

The biometric sensing unit 230 can acquire the user's biometric information. The biometric sensing module 230 may include a sensor for detecting the user's biometric information and acquire fingerprint information and heart rate information regarding the user using the sensor. The biometric information may be used for user authentication.

The output unit 250 can generate an output related to a visual, audible or tactile signal. The output unit 250 may include at least one of a display module 251, an audio output module 252 and a haptic output module 253.

The display module 251 can output graphic objects corresponding to various types of information. The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen. The display module 251 may be implemented as a head up display (HUD). When the display module 251 is implemented as the HUD, the display module 251 can be provided with a projecting module so as to output information through an image which is projected on a windshield or a window.

The display module 251 may include a transparent display. The transparent display may be attached to the windshield or the window. The transparent display can also have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In addition, the user interface apparatus 200 may include a plurality of display modules 251a to 251g. The display module 251 can be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. Thus, the audio output module 252 may include at least one speaker. The haptic output module 253 generates a tactile output. For example, the haptic output module 253 may vibrate the steering wheel, a safety belt, a seat 110FL, 110FR, 110RL, 110RR such that the user can recognize such output.

The processor 270 can control an overall operation of each unit of the user interface apparatus 200. The user interface apparatus 200 may include a plurality of processors 270 or may not include any processor 270. When the processor 270 is not included in the user interface apparatus 200, the user interface apparatus 200 can operate according to a control of a processor of another apparatus within the vehicle 100 or the controller 170.

In addition, the user interface apparatus 200 may be called as a display apparatus for vehicle. The user interface apparatus 200 can operate according to the control of the controller 170. The object detecting apparatus 300 is for detecting an object located at outside of the vehicle 100. The object may be a variety of objects associated with driving (operation) of the vehicle 100.

Figure 5:
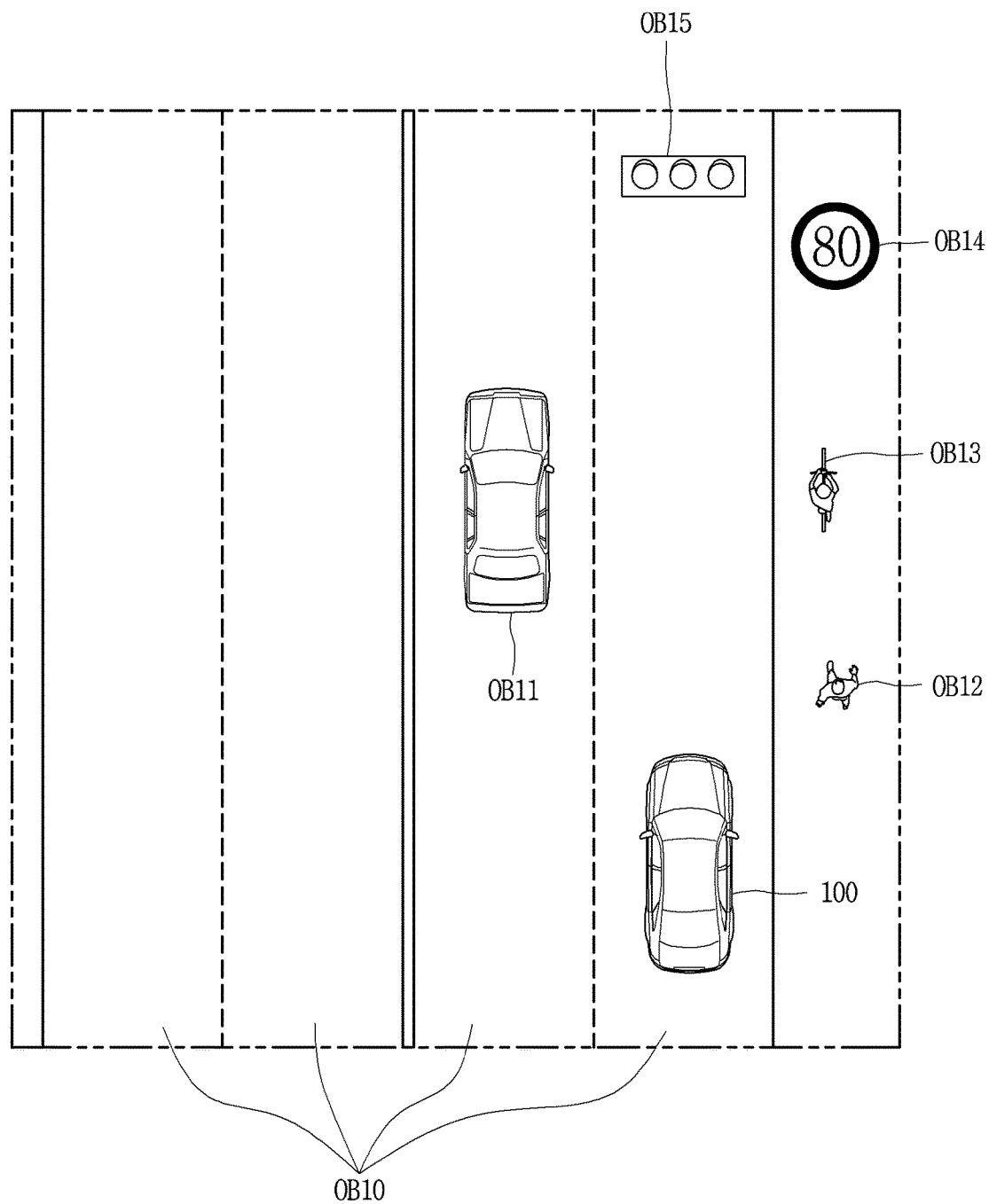
FIGS. 5 and 6 are views referred to in explaining an object according to an embodiment of the present disclosure.
Figure 6:
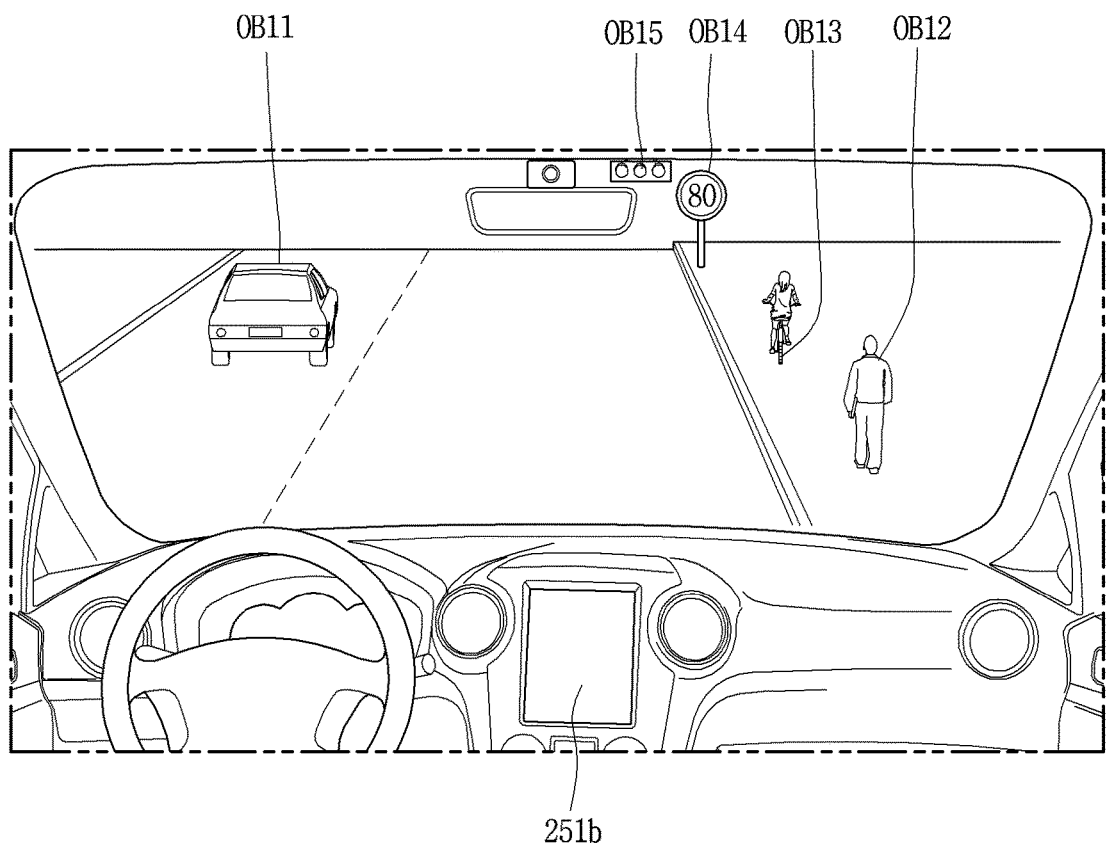

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like. The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface. The light may be light emitted from a lamp provided on another vehicle. The light may be light generated from a streetlamp. The light may be solar light.

The road may include a road surface, a curve, an upward slope, a downward slope and the like. The structure may be an object that is located near a road and fixed on the ground. For example, the structure may include a streetlamp, a roadside tree, a building, an electric pole, a traffic light, a bridge and the like.

The geographical feature may include a mountain, a hill and the like. In addition, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370. The object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera. For example, the camera 310 can be disposed adjacent to a front windshield within the vehicle to acquire a front image of the vehicle. Or, the camera 310 can be disposed adjacent to a front bumper or a radiator grill.

For example, the camera 310 can be disposed adjacent to a rear glass within the vehicle to acquire a rear image of the vehicle. Or, the camera 310 can be disposed adjacent to a rear bumper, a trunk or a tail gate. For example, the camera 310 can be disposed adjacent to at least one of side windows within the vehicle to acquire a side image of the vehicle. Or, the camera 310 can be disposed adjacent to a side mirror, a fender or a door.

The camera 310 can provide an acquired image to the processor 370. The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 can detect an object in a time of flight (TOF) manner or a phase-shift manner through the medium of the electric wave, and detect a position of the detected object, a distance from the detected object and a relative speed with the detected object. The radar 320 can be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner. The LiDAR 330 may be implemented as a drive type or a non-drive type.

For the drive type, the LiDAR 330 can be rotated by a motor and detect object near the vehicle 100. For the non-drive type, the LiDAR 330 can detect, through light steering, objects which are located within a predetermined range based on the vehicle 100. The vehicle 100 can include a plurality of non-drive type LiDARs 330.

The LiDAR 330 can detect an object in a TOP manner or a phase-shift manner through the medium of a laser beam, and detect a position of the detected object, a distance from the detected object and a relative speed with the detected object. The LiDAR 330 can be disposed on an appropriate position outside the vehicle for detecting an object located at the front, rear or side of the vehicle.

The ultrasonic sensor 340 may include ultrasonic wave transmitting and receiving portions. The ultrasonic sensor 340 can detect an object based on an ultrasonic wave, and detect a position of the detected object, a distance from the detected object and a relative speed with the detected object.

The ultrasonic sensor 340 can be disposed on an appropriate position outside the vehicle for detecting an object located at the front, rear or side of the vehicle. The infrared sensor 350 may include infrared light transmitting and receiving portions. The infrared sensor 340 can detect an object based on infrared light, and detect a position of the detected object, a distance from the detected object and a relative speed with the detected object.

The infrared sensor 350 can be disposed on an appropriate position outside the vehicle for detecting an object located at the front, rear or side of the vehicle. The processor 370 can control an overall operation of each unit of the object detecting apparatus 300.

The processor 370 can detect an object based on an acquired image, and track the object. The processor 370 can execute operations, such as a calculation of a distance from the object, a calculation of a relative speed with the object and the like, through an image processing algorithm.

The processor 370 can detect an object based on a reflected electromagnetic wave which an emitted electromagnetic wave is reflected from the object, and track the object. The processor 370 can execute operations, such as a calculation of a distance from the object, a calculation of a relative speed with the object and the like, based on the electromagnetic wave.

The processor 370 can detect an object based on a reflected laser beam which an emitted laser beam is reflected from the object, and track the object. The processor 370 can execute operations, such as a calculation of a distance from the object, a calculation of a relative speed with the object and the like, based on the laser beam.

The processor 370 can detect an object based on a reflected ultrasonic wave which an emitted ultrasonic wave is reflected from the object, and track the object. The processor 370 can execute operations, such as a calculation of a distance from the object, a calculation of a relative speed with the object and the like, based on the ultrasonic wave.

The processor can detect an object based on reflected infrared light which emitted infrared light is reflected from the object, and track the object. The processor 370 can execute operations, such as a calculation of a distance from the object, a calculation of a relative speed with the object and the like, based on the infrared light.

The object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 can operate according to the control of a processor of an apparatus within the vehicle 100 or the controller 170.

The object detecting apparatus 300 can operate according to the control of the controller 170. The communication apparatus 400 is for performing communication with an external device. Here, the external device may be another vehicle, a mobile terminal or a server.

The communication apparatus 400 can perform the communication by including at least one of a transmitting antenna, a receiving antenna, and radio frequency (RF) circuit and RF device for implementing various communication protocols. The communication apparatus 400 may include a short-range communication unit 410, a location information unit 420, a V2X communication unit 430, an optical communication unit 440, a broadcast transceiver 450 and a processor 470.

The communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 can construct short-range area networks to perform short-range communication between the vehicle 100 and at least one external device. The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

The light-emitting diode may be integrated with lamps provided on the vehicle 100. The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 can control an overall operation of each unit of the communication apparatus 400. The communication apparatus 400 may include a plurality of processors 470 or may not include any processor 470. When the processor 470 is not included in the communication apparatus 400, the communication apparatus 400 can operate according to the control of a processor of another device within the vehicle 100 or the controller 170.

In addition, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 can operate according to the control of the controller 170. The driving control apparatus 500 is for receiving a user input for driving. In a manual mode, the vehicle 100 can be operated based on a signal provided by the driving control apparatus 500.

The driving control apparatus 500 may include a steering input device 510, an acceleration input device 530 and a brake input device 570. The steering input device 510 can receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 can receive an input for accelerating the vehicle 100 from the user. The brake input device 570 can receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 can operate according to the control of the controller 170. The vehicle operating apparatus 600 is for electrically controlling operations of various devices within the vehicle 100. The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described. In addition, the vehicle operating apparatus 600 may include a processor. Each unit of the vehicle operating apparatus 600 may individually include a processor.

The power train operating unit 610 can control an operation of a power train device. The power train operating unit 610 may include a power source operating portion 611 and a gearbox operating portion 612.

The power source operating portion 611 can perform a control for a power source of the vehicle 100. For example, upon using a fossil fuel-based engine as the power source, the power source operating portion 611 can perform an electronic control for the engine. Accordingly, an output torque and the like of the engine can be controlled. The power source operating portion 611 can adjust the engine output torque according to the control of the controller 170.

For example, upon using an electric energy-based motor as the power source, the power source operating portion 611 can perform a control for the motor. The power source operating portion 611 can adjust a rotating speed, a torque and the like of the motor according to the control of the controller 170.

The gearbox operating portion 612 can perform a control for a gearbox. The gearbox operating portion 612 can adjust a state of the gearbox. The gearbox operating portion 612 can change the state of the gearbox into drive (forward) (D), reverse (R), neutral (N) or parking (P).

In addition, when an engine is the power source, the gearbox operating portion 612 can adjust a locked state of a gear in the drive (D) state. The chassis operating unit 620 can control an operation of a chassis device. The chassis operating unit 620 may include a steering operating portion 621, a brake operating portion 622 and a suspension operating portion 623.

The steering operating portion 621 can perform an electronic control for a steering apparatus within the vehicle 100. The steering operating portion 621 can change a driving direction of the vehicle. The brake operating portion 622 can perform an electronic control for a brake apparatus within the vehicle 100. For example, the brake operating portion 622 can control an operation of brakes provided at wheels to reduce speed of the vehicle 100.

In addition, the brake operating portion 622 may individually control each of a plurality of brakes. The brake operating portion 622 can differently control braking force applied to each of a plurality of wheels.

The suspension operating portion 623 can perform an electronic control for a suspension apparatus within the vehicle 100. For example, the suspension operating portion 623 can control the suspension apparatus to reduce vibration of the vehicle 100 when a bump is present on a road.

In addition, the suspension operating portion 623 can individually control each of a plurality of suspensions. The door/window operating unit 630 can perform an electronic control for a door apparatus or a window apparatus within the vehicle 100. The door/window operating unit 630 may include a door operating portion 631 and a window operating portion 632.

The door operating portion 631 can perform the control for the door apparatus. The door operating portion 631 can control opening or closing of a plurality of doors of the vehicle 100. The door operating portion 631 can control opening or closing of a trunk or a tail gate. The door operating portion 631 can control opening or closing of a sunroof.

The window operating portion 632 can perform the electronic control for the window apparatus. The window operating portion 632 can control opening or closing of a plurality of windows of the vehicle 100. The safety apparatus operating unit 640 can perform an electronic control for various safety apparatuses within the vehicle 100.

The safety apparatus operating unit 640 may include an airbag operating portion 641, a seatbelt operating portion 642 and a pedestrian protecting apparatus operating portion 643. The airbag operating portion 641 can perform an electronic control for an airbag apparatus within the vehicle 100. For example, the airbag operating portion 641 can control the airbag to be deployed upon a detection of a risk.

The seatbelt operating portion 642 can perform an electronic control for a seatbelt apparatus within the vehicle 100. For example, the seatbelt operating portion 642 can control passengers to be motionlessly seated in seats 110FL, 110FR, 110RL, 110RR using seatbelts upon a detection of a risk. The pedestrian protecting apparatus operating portion 643 can perform an electronic control for a hood lift and a pedestrian airbag. For example, the pedestrian protecting apparatus operating portion 643 can control the hood lift and the pedestrian airbag to be open up upon detecting pedestrian collision.

The lamp operating unit 650 can perform an electronic control for various lamp apparatuses within the vehicle 100. The air-conditioner operating unit 660 can perform an electronic control for an air conditioner within the vehicle 100. For example, the air-conditioner operating unit 660 can control the air conditioner to supply cold air into the vehicle when internal temperature of the vehicle is high.

The vehicle operating apparatus 600 may include a processor. Each unit of the vehicle operating apparatus 600 may individually include a processor. The vehicle operating apparatus 600 can operate according to the control of the controller 170. The operation system 700 is a system that controls various driving modes of the vehicle 100. The operation system 700 may include a driving system 710, a parking exit system 740 and a parking system 750.

The operation system 700 may further include other components in addition to components to be described, or may not include some of the components to be described. In addition, the operation system 700 may include a processor. Each unit of the operation system 700 may individually include a processor.

The operation system may be a sub concept of the controller 170 when it is implemented in a software configuration. In addition, according to embodiment, the operation system 700 may be a concept including at least one of the user interface apparatus 200, the object detecting apparatus 300, the communication apparatus 400, the vehicle operating apparatus 600 and the controller 170.

The driving system 710 can perform driving of the vehicle 100. The driving system 710 can receive navigation information from a navigation system 770, transmit a control signal to the vehicle operating apparatus 600, and perform driving of the vehicle 100.

The driving system 710 can receive object information from the object detecting apparatus 300, transmit a control signal to the vehicle operating apparatus 600 and perform driving of the vehicle 100. The driving system 710 can receive a signal from an external device through the communication apparatus 400, transmit a control signal to the vehicle operating apparatus 600, and perform driving of the vehicle 100.

The parking exit system 740 can perform an exit of the vehicle 100 from a parking lot. The parking exit system 740 can receive navigation information from the navigation system 770, transmit a control signal to the vehicle operating apparatus 600, and perform the exit of the vehicle 100 from the parking lot.

The parking exit system 740 can receive object information from the object detecting apparatus 300, transmit a control signal to the vehicle operating apparatus 600 and perform the exit of the vehicle 100 from the parking lot. The parking exit system 740 can receive a signal from an external device through the communication apparatus 400, transmit a control signal to the vehicle operating apparatus 600, and perform the exit of the vehicle 100 from the parking lot.

The parking system 750 can perform parking of the vehicle 100. The parking system 750 can receive navigation information from the navigation system 770, transmit a control signal to the vehicle operating apparatus 600, and park the vehicle 100.

The parking system 750 can receive object information from the object detecting apparatus 300, transmit a control signal to the vehicle operating apparatus 600 and park the vehicle 100. The parking system 750 can receive a signal from an external device through the communication apparatus 400, transmit a control signal to the vehicle operating apparatus 600, and park the vehicle 100.

The navigation system 770 can provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor can control an operation of the navigation system 770. The navigation system 770 may update prestored information by receiving information from an external device through the communication apparatus 400. The navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 can acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 can be provided with a port connectable with a mobile terminal, and connected to the mobile terminal through the port. In this instance, the interface unit 130 may exchange data with the mobile terminal.

In addition, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

The memory 140 may be integrated with the controller 170 or implemented as a sub component of the controller 170. The controller 170 can control an overall operation of each unit of the vehicle 100. The controller 170 may be referred to as an Electronic Control Unit (ECU).

The power supply unit 190 can supply power required for an operation of each component according to the control of the controller 170. Specifically, the power supply unit 190 can receive power supplied from an internal battery of the vehicle, and the like.

At least one processor and the controller 170 included in the vehicle 100 can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Figure 8A:
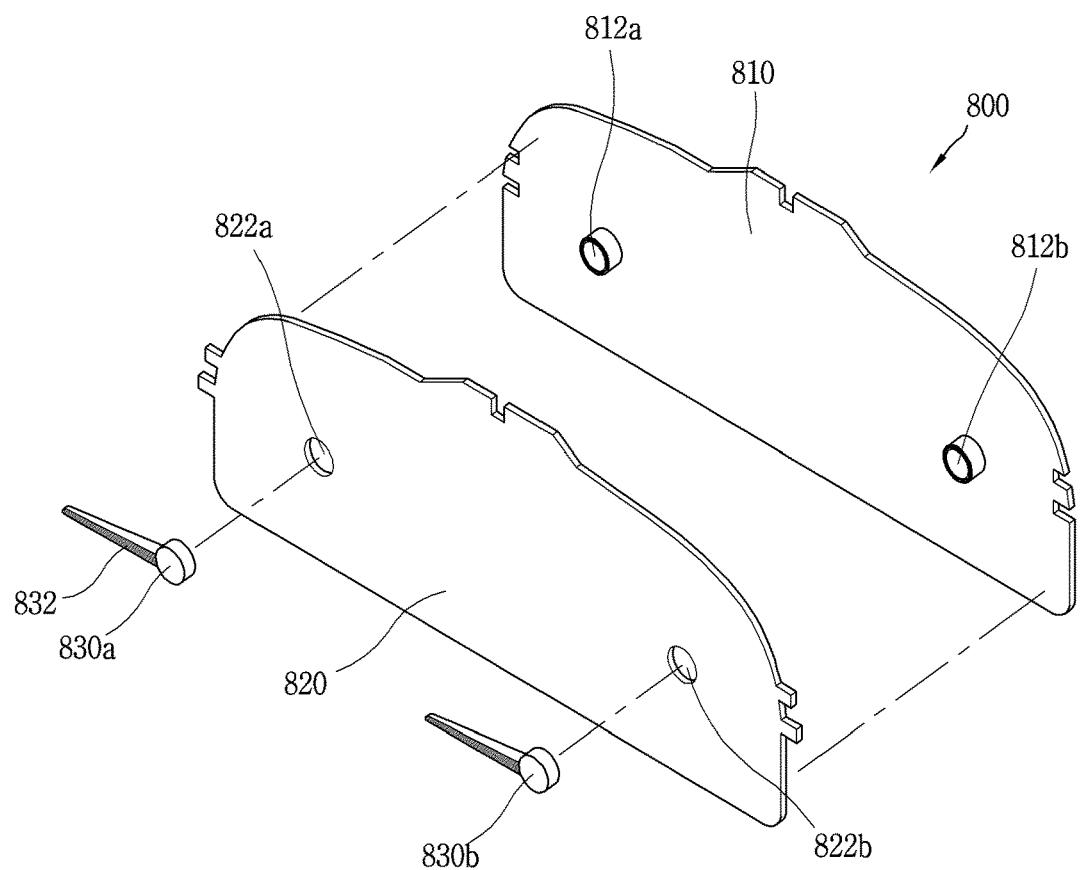
FIGS. 8A and 8B are conceptual views illustrating a structure of a dashboard display according to an embodiment of the present disclosure.
Figure 8B:
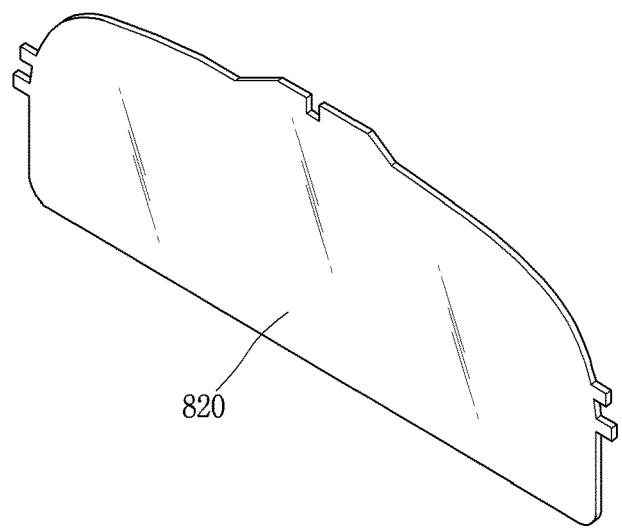

FIGS. 8A and 8B are conceptual views illustrating a structure of a dashboard display according to an embodiment of the present disclosure. For example, a dashboard display 800 may include a base substrate 810, a display unit 820, and at least one needle 830 as illustrated in FIG. 8A.

The display unit 820 can be disposed on the base substrate 810 and at least one needle 830 can be disposed on the display unit 820. More specifically, the display unit 820 includes a hollow 822, and the needle 830 can rotate according to rotation of a rotary shaft passing through the hollow. The driving unit provided on the rear side of the display unit 820 provides an external force to rotate the rotary shaft, and the needle 830 is rotated by an external force provided from the driving unit.

However, these components are not limited to the arrangement illustrated in FIG. 8A. These components may be excluded or replaced as needed, or may be arranged in a different manner. For example, a virtual needle implemented by software, rather than a physical needle present in the dashboard display 800. In this instance, the needle is displayed as a virtual graphical object and disappears from the dashboard display 800 when the dashboard display 800 is turned off, as illustrated in FIG. 8B.

The dashboard display 800 displays information processed in the vehicle 100. For example, the dashboard display 800 can display execution screen information of an application program driven by the vehicle 100, or UI (User Interface) and GUI (Graphic User Interface) information according to the execution screen information.

The display unit 820 may include at least one of a liquid crystal display (LCD), a thin film transistor-liquid crystal display (TFT LCD), an organic light-emitting diode (OLED), a flexible display, a 3D display, and an e-ink display. In addition, two or more display units 820 may be present according to the implementations of the dashboard display 800. In this instance, in the dashboard display 800, a plurality of displays can be spaced apart from each other or arranged integrally on one surface, and can be arranged on different surfaces, respectively.

In addition, a fixing portion 812 for fixing the needle 830 is formed on the base substrate 810. The needle 830 is fixed to the fixing portion 812 through the hollow 822 provided in the display 820 and is rotated about an axis by a driving unit. As shown, the needle 830 can include a pointer 832 and a driving unit for rotating the pointer 832 to indicate a gradation (or a specific value) of a gauge output from the display unit 820. The pointer 832 is formed to be sharp to indicate the gradation of the gauge.

Further, the driving unit, a component applying power to rotate the pointer 832, may be forming of a motor, an actuator, a magnet, and the like. The needle 830 further includes a light emitting portion, and one surface of the pointer 832 may be formed to be transparent or opaque to allow light emitted from the light emitting portion to pass therethrough. Due to the light emitting portion, the pointer 832 may have a predetermined color, and a driver can accurately check a gradation indicated by the pointer 832 even at night.

The processor of the dashboard display 800 controls information output on the display unit 820 and controls the needles 830 according to the output information. For example, the processor can control the display unit 820 to display a speedometer and control a driving unit of the needle 830 so that the pointer 832 indicates a current speed of the vehicle 100.

Figure 9:
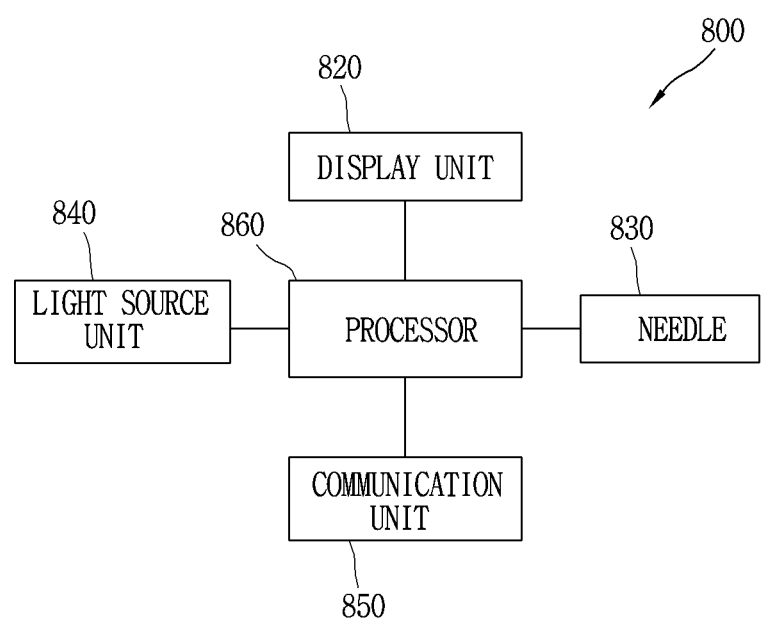
FIG. 9 is a block diagram illustrating a dashboard display according to an embodiment of the present disclosure.

Hereinafter, embodiments related to the control method that can be implemented in the dashboard display configured as described above will be described with reference to the accompanying drawings. In particular, FIG. 9 is a block diagram illustrating a dashboard display 800 according to an embodiment of the present disclosure. The dashboard display 800 includes a display (or display unit) 820, the needle 830, a light source unit 840, a communication unit 850, and a processor 860. The display unit 820 and the needle 830 have been described above with reference to FIGS. 8A and 8B, and thus, a description thereof will be omitted.

Figure 10A:
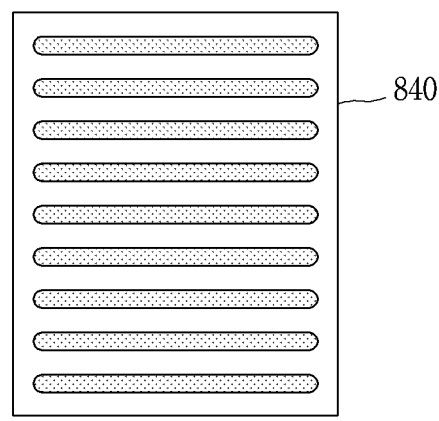
FIGS. 10A and 10B are views illustrating an arrangement of light sources.
Figure 10B:
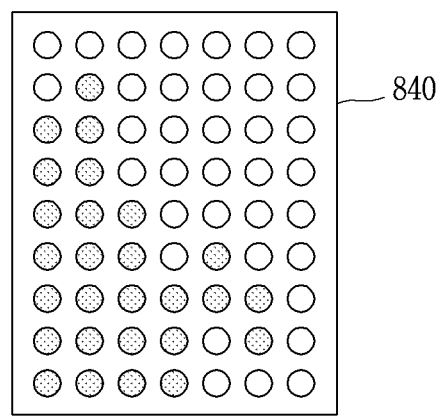

The light source unit 840 includes a plurality of light sources arranged in a matrix form. For example, as illustrated in FIG. 10A, when cold cathode fluorescent lamps in a thin tube shape can be arranged abreast of each other or as illustrated in FIG. 10B, light emitting diodes can be arranged in m rows and n columns. Here, m and n refer to natural numbers. In addition, a planar light source capable of controlling light in units of pixels may be included in the light source unit.

The light sources are configured such that at least one of brightness and ON/OFF is individually adjusted. For example, the processor 860 can control an intensity of light output from each light source or control each light source to be turned on or off, by controlling an amount of current supplied to each light source.

Although an image having a predetermined color is output to a predetermined region of the display unit 820, a contrast of the image can be varied according to light outputs of the light sources providing light to the predetermined region. For example, when light sources included in a first portion are turned on and light sources included in a second portion are turned off based on the predetermined region, the brightness of the first portion and the brightness of the second portion are different from each other although an image has the same color. In this instance, the user can visually see the boundary line between the first portion and the second portion.

In addition, the communication unit 850 is configured to perform communication with various components described above with reference to FIG. 7. For example, the communication unit 850 can receive various types of information provided through a controller region network (CAN). In another example, the communication unit 850 can perform communication with a vehicle, a mobile terminal and a server, and any device which can communicate with other vehicle. This may be termed vehicle-to-everything (V2X) communication, which can be defined as a technology of exchanging or sharing information such as traffic situation, or the like, while communicating with a road infrastructure and other vehicle, during driving.

The communication unit 850 can receive information related to driving of a vehicle from most devices provided in the vehicle 100. In the vehicle 100, information transmitted to the vehicle control device 800 will be referred to as "vehicle driving information". The vehicle driving information includes vehicle information and surrounding information of the vehicle. Information related to the inside of the vehicle with respect to a frame of the vehicle 100 can be defined as vehicle information, and information related to the outside of the vehicle can be defined as surrounding information.

Vehicle information refers to information regarding a vehicle itself. For example, vehicle information may include a driving speed of a vehicle, a running direction, acceleration, an angular velocity, a position (GPS), a weight, the number of occupants in a vehicle, braking power of a vehicle, maximum braking power of a vehicle, pressure of each wheel, centrifugal force applied to a vehicle, a running mode of a vehicle (whether the vehicle is in an autonomous driving mode or a manual driving mode), a parking mode of a vehicle (autonomous parking mode, autonomic parking mode, manual parking mode), whether a user is present within a vehicle, information related to a user, and the like.

The surrounding information refers to information regarding another object positioned within a predetermined range around a vehicle and information related to the outside of a vehicle. For example, the surrounding information may be a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, brightness around the vehicle, information related to an object present within a reference region (predetermined area) with respect to the vehicle, whether an object enters/leaves the predetermined region, whether a user is present in the vicinity of the vehicle, information related to the user (e.g., whether the user is an authenticated user or not), and the like.

Also, the surrounding information may include ambient brightness, temperature, a location of the sun, information of an object positioned nearby ((person, another vehicle, a sign, etc.), a type of a road surface on which the vehicle is driving, a geographic feature, line information, or lane information in which the vehicle is driving, and information required for autonomous driving/autonomous parking/automatic parking/manual parking mode. The surrounding information may further include a distance between an object present in the vicinity of the vehicle 100 and the vehicle 100, a possibility of collision, a type of the object, a parking space in which the vehicle may park, an object (e.g., a parking line, a string, another vehicle, a wall, etc.) for identifying the parking space, and the like. The vehicle driving information is not limited to the examples described above and may include every information generated from components provided in the vehicle 100.

In addition, the processor 860 can control the light source unit 840 such that a predetermined region of the display unit 820 has a predetermined brightness based on the position of the needle 830. At this time, at least one of shape, position, and size of the predetermined region can be varied depending on the position of the needle. The needle 830 is configured to emit predetermined light. However, there is a problem in that light output from the needle 830 and light output from the lower side of the needle 830 overlap. The needle 830 must be clearly distinguished from other information but glare makes the boundary between the needle 830 and other information unclear, degrading visibility of the driver with respect to the needle 830.

Figure 11:
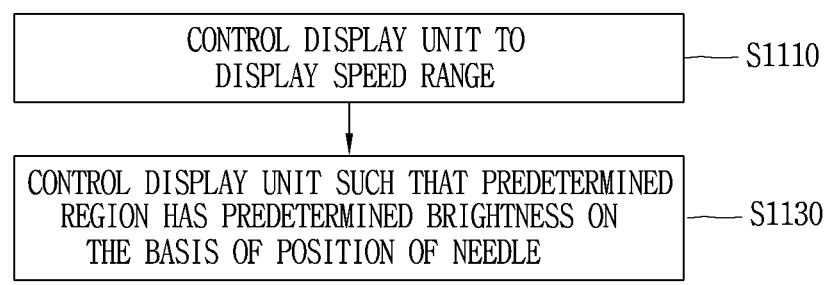
FIG. 11 is a flowchart illustrating a control method of the dashboard display of FIG. 9.

Hereinafter, embodiments in which the predetermined region is controlled based on a position of the needle 830 will be described in detail with reference to the accompanying drawings. In particular, FIG. 11 is a flowchart illustrating a method for controlling a dashboard display of FIG. 9, and FIGS. 12A to 12E are views illustrating embodiments according to the control method of FIG. 11.

First, the processor 860 controls the display unit 820 to display the speed range (S1110). In more detail, the display unit 820 is configured to output various types of time information using light provided by the light source unit 840. For example, the display unit 820 can display a speed range in a partial region such that the needle 830 indicates a current speed of the vehicle 100.

The speed range refers to a range of speed at which the vehicle 100 can travel and includes a minimum speed and a maximum speed. The minimum speed and the maximum speed may be set in advance at the time of releasing the product of the dashboard display. The maximum speed varies according to vehicles, and the minimum speed is generally 0 km/h.

In the present disclosure, km/h is used as an example of a unit indicating speed, but it can be varied according to embodiments. The speed range may be a speed gauge (or speedometer) made up of a minimum speed to a maximum speed. Hereinafter, the speed range and the speed gauge may be used in combination as having the same meaning.

The speed range is a virtual graphic object for guiding a current speed of the vehicle, and includes a plurality of gradations. The plurality of gradations correspond to different reference velocities, respectively, and represent any one of a minimum velocity and a maximum velocity. That is, the plurality of gradations guide different speeds between the minimum speed and the maximum speed.

In addition, the plurality of gradations can be spaced apart at regular intervals. For example, in first to third graduations which are arranged successively, a distance between the first graduation and the second graduation may match a distance between the second graduation and the third graduation. The distance between the gradations reflects unit speed. Since the plurality of gradations are spaced apart at regular intervals, a speed at which the gradations guide is sequentially increased in accordance with arrangement order. For example, when a unit speed is 10 km/h, and when the first gradation corresponds to 50 km/h, the second gradation corresponds to 60 km/h and the third gradation corresponds to 70 km/h.

Further, as the unit speed is changed, a reference speed at which the gradations guide can be changed. For example, if the unit speed is changed from 10 km/h to 20 km/h, the second gradation will guide 70 km/h instead of 60 km/h. In addition, the needle 830 can indicate between a gradation corresponding to the minimum speed of the speed range and a gradation corresponding to the maximum speed of the speed range and moves to point to the current speed of the vehicle 100.

The processor 860 moves the needle 830 such that the needle 830 points to the current speed of the vehicle 100 in consideration of the unit speed corresponding to the interval between the gradations. For example, if the vehicle 100 is stationary, the needle can point to a gradation corresponding to the minimum speed of 0 km/h. In another example, if the vehicle 100 is traveling at 90 km/h, the needle 830 indicates a gradation corresponding to the 90 km/h or a position corresponding to 90 km/h if there is no corresponding gradation.

In addition, the needle 830 moves in a direction from the minimum speed toward the maximum speed when the vehicle 100 is accelerated and moves in a direction from the maximum speed to the minimum speed when the vehicle 100 is decelerated. For example, when the gradations between the minimum speed and the maximum speed are arranged in the clockwise direction, the needle 830 can rotate in the clockwise direction when the vehicle 100 is accelerated, and rotate in the counterclockwise direction when the vehicle 100 is decelerated. In another example, when the gradations between the minimum speed and the maximum speed are disposed in the counterclockwise direction, the needle 830 can rotate in the counterclockwise direction when the vehicle 100 is accelerated, and rotate in the clockwise direction when the vehicle 100 is decelerated.

Next, the processor 860 controls the light source unit 840 such that a predetermined region of the display unit 820 has a predetermined brightness, based on the position of the needle 830 (S1130). The predetermined region and/or the predetermined brightness can be varied according to positions of the needle 830. Further, the predetermined region and/or the predetermined brightness can be varied according to vehicle running information received through the communication unit.

For example, the predetermined region can include an edge region surrounding at least a portion of the needle 830. This is to distinguish the needle 830 from the information output from the display unit 820. That is, a boundary line is to be formed using light, or halo light emitted from the rear of the needle 830 is to be created.

The processor 860 senses a position of the needle 830 that guides a speed of the vehicle 100 and sets the predetermined region based on the position of the needle 830. Then, the processor 860 selects at least one light source based on the predetermined region and controls the selected light source so that the predetermined region has a predetermined brightness.

The processor 860 can classify the light sources into a first group and a second group based on the predetermined region. Here, the first group may include a light source that provides light to the predetermined region, and the second group may include a light source that provides light to a region other than the predetermined region.

For example, the processor 860 can control the light source unit 840 such that the light sources included in the first group output light of a first brightness, and the light sources included in the second group output light of a second brightness different from the first brightness. In another example, the processor 860 can control the light sources included in the first group and the second group to output light of the same brightness, and here, the processor 860 can turn off some of the light sources included in the second group so that the predetermined region is controlled to have the predetermined brightness. In more detail, the processor 860 can classify the light sources included in the second group into two groups and control the light source unit 840 such that light sources included in one group are turned and light sources included in the other group are turned off.

Figure 12A:
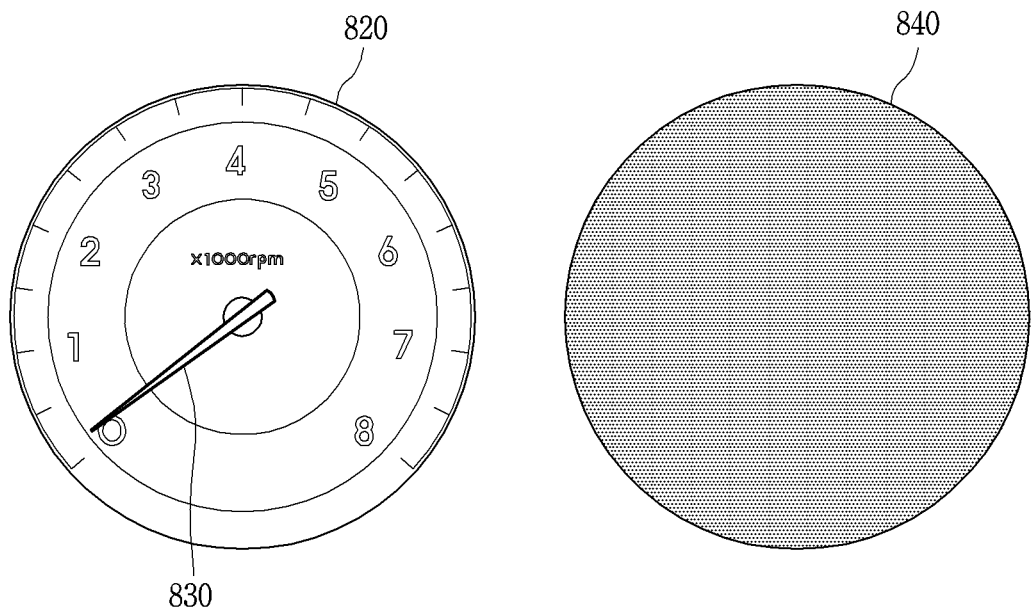
FIGS. 12A to 12E are views illustrating embodiments according to the control method of FIG. 11.

Next, FIG. 12A illustrates the display unit 820 and the light source unit 840 before the present disclosure is applied. The speed information is displayed on the display unit 820, and the light sources included in the light source unit 840 output light corresponding to basic brightness constantly.

Figure 12B:
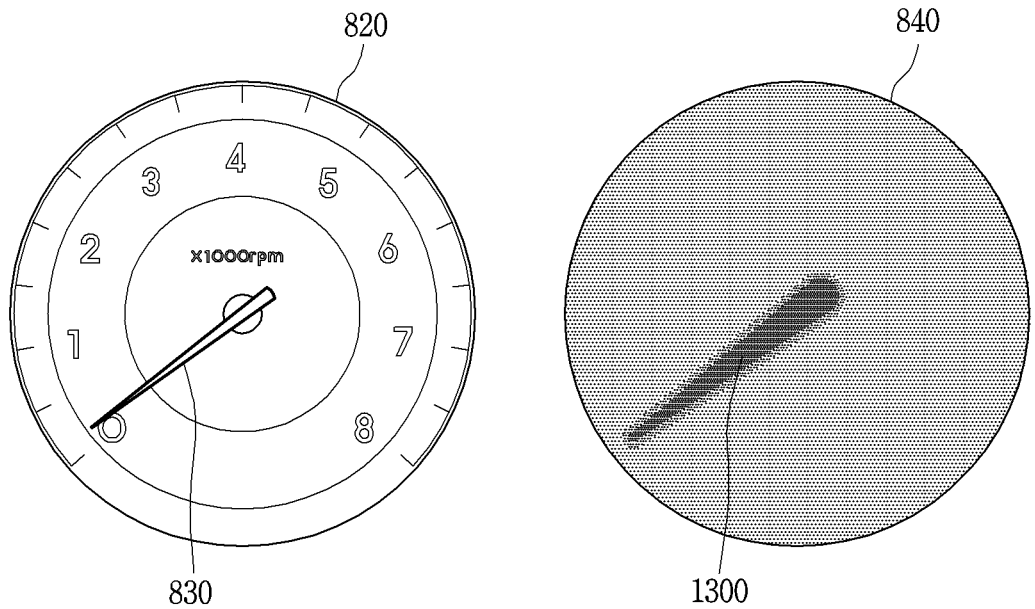

In contrast, FIGS. 12B to 12E illustrate the display unit 820 and the light source unit 840 to which the present disclosure is applied. For example, as illustrated in FIG. 12B, the predetermined region 1300 can be set to include an edge of the needle 830, and at least one light source included in the predetermined region 1300 can be turned off. Accordingly, the predetermined region 1300 is darker than other areas, and light output from the needle 830 is compared with light output from the predetermined region 1300 to obtain an effect that the needle 830 is brighter.

Figure 12C:
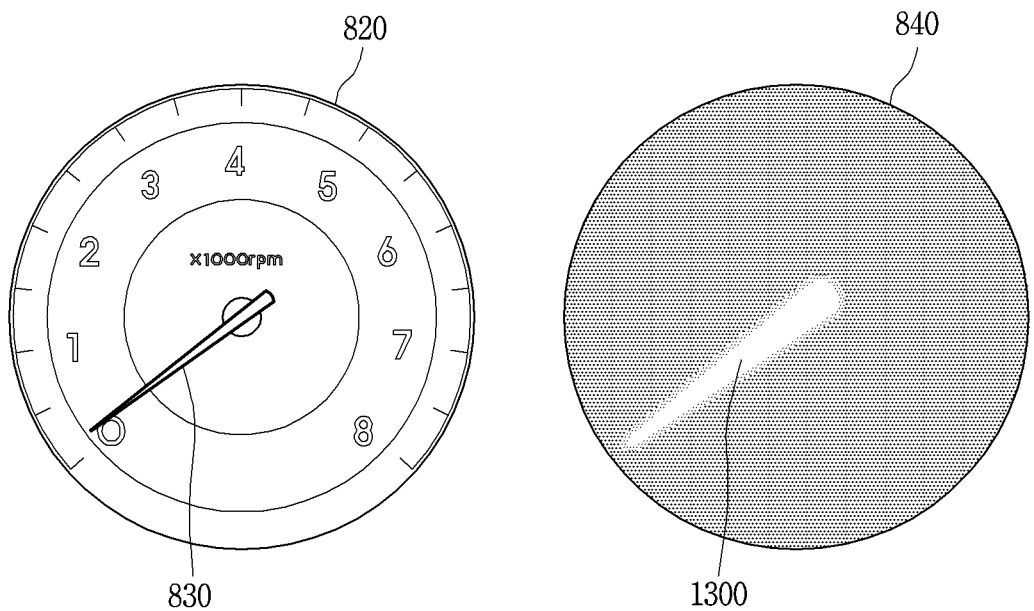

In another example, as illustrated in FIG. 12C, at least one light source included in the predetermined region 1300 can output light which is brighter than other light sources. In other words, the processor 860 can select at least one light source based on the predetermined region and control the light source unit 840 such that the selected light source outputs light having the second brightness brighter than the first brightness. Since the predetermined region 1300 emits bright light from the rear side of the needle 830, a halo effect for the needle 830 can be generated.

Figure 12D:
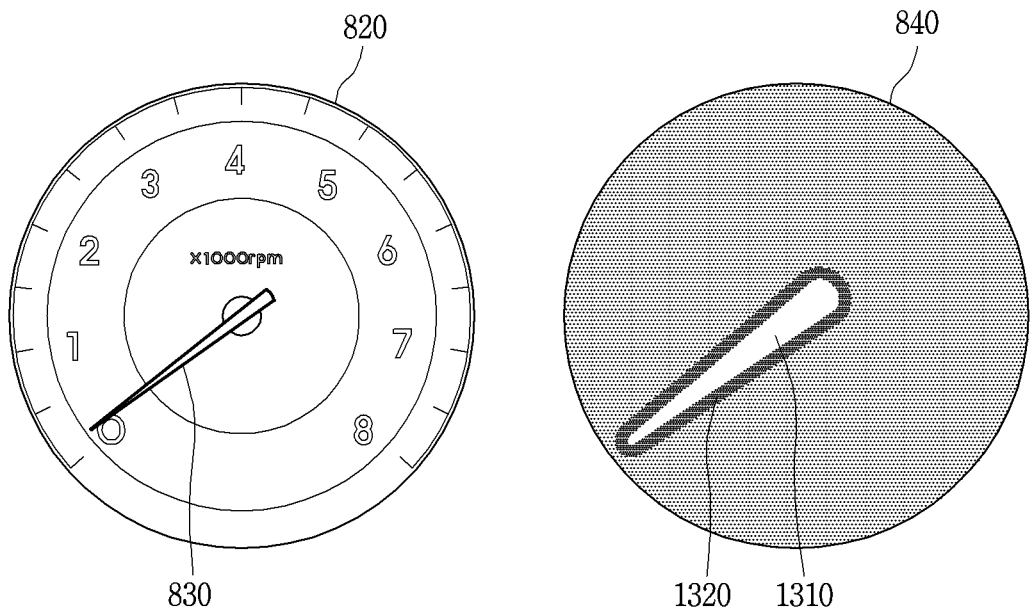

In another example, as illustrated in FIG. 12D, the predetermined region 1300 includes a first region 1310 that surrounds at least a portion of the needle 830 and a second region 1320 that surrounds at least a portion of the first region 1310. The light source unit 840 can be controlled such that the first region 1310 has a first brightness and the second region 1320 has a second brightness different from the first brightness. In other words, the processor 860 can control the light source unit 840 such that the first region 1310 and the second region 1320 have different brightnesses.

When the predetermined region 1300 includes the first region 1310 and the second region 1320, the first region 1310 can have a maximum brightness and the second region 1320 can have a minimum brightness. The minimum brightness can be achieved by turning off all the light sources corresponding to the second region 1320. A more distinct contrast can thus be formed by the two regions 1310 and 1320 having different brightnesses.

In addition, the second region 1320 can be varied according to speeds and/or acceleration of the vehicle 100. In more detail, since the position of the needle 830 is varied according to speeds and/or acceleration of the vehicle 100, the processor 860 moves the first region 1310 and the second region 1320 according to the position of the needle 830. In addition, when a size of the first region 1310 is fixed, the processor 860 can change a size of the second region 1320 according to the speeds and/or acceleration of the vehicle 100.

For example, the second region 1320 can have a first size and be changed to a second size larger than the first size when a speed of the vehicle 100 accelerates or decelerates to exceed a reference acceleration. As the second region 1320 is changed, a dynamic dashboard display 800 can be provided and the speed and/or acceleration of the vehicle 100 can be visually sensed.

Further, the first region 1310 and the second region 1320 can have a gradation effect based on the needle 830. This gradation effect can be applied differently according to various conditions to be described below with reference to FIG. 14.

Figure 12E:
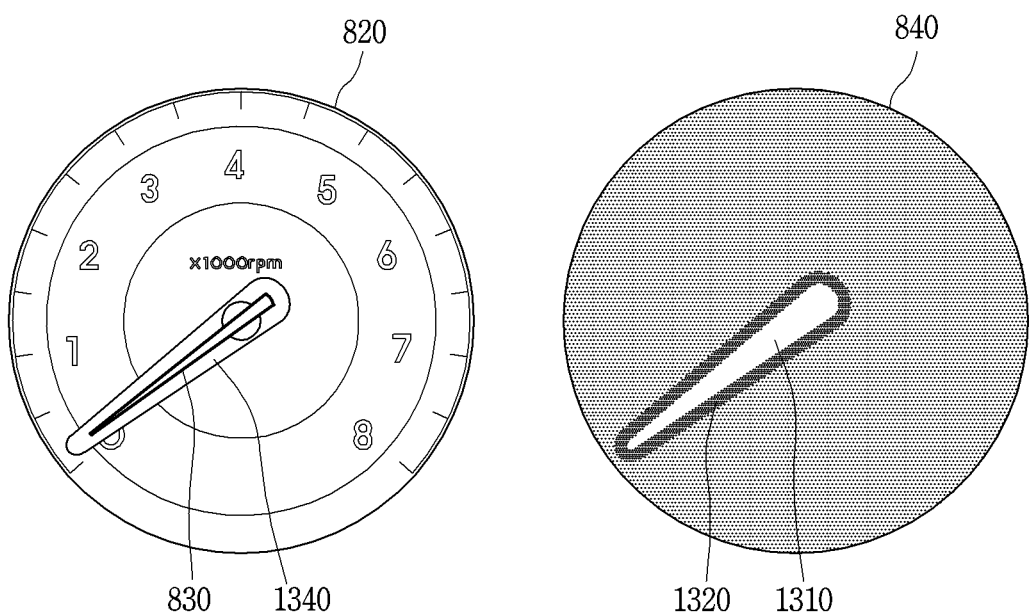

The processor 860 can control the light source unit 840 such that the predetermined region 1300 has the predetermined brightness and control the display unit 820 such that at least a portion of information displayed in the predetermined region 1300 disappears. For example, as illustrated in FIG. 12E, the processor 860 can control the display unit 820 such that an image of a predetermined color is output on a predetermined region 1340. This is to ensure that the needle 830 is more visually distinctive to the driver.

The predetermined color can be white when the predetermined region 1340 is controlled to be brighter than other areas, and can be black when the predetermined region 1340 is controlled to be darker than other areas. It is to maximize the effect of contrast.

Figure 13:
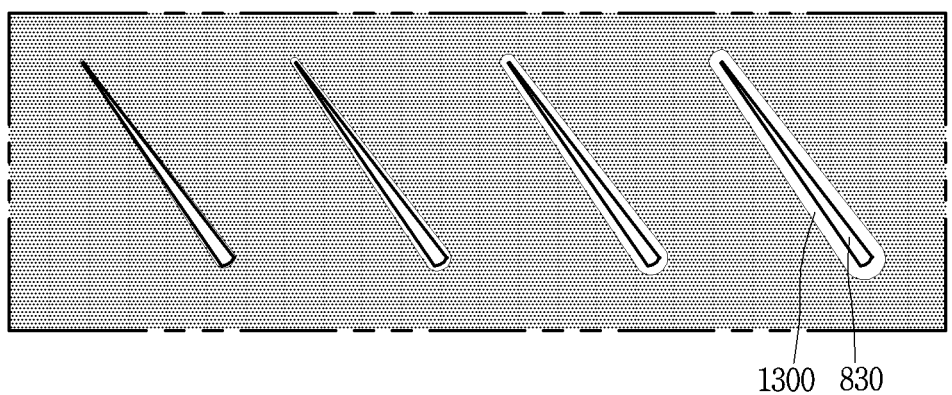
FIG. 13 is a view illustrating an effect that appears as a predetermined region is varied.

Next, FIG. 13 is an exemplary view illustrating an effect that occurs when a predetermined region is varied. Referring to FIG. 13, at least one of the position, size, and shape of the predetermined region 1300 positioned under the needle 830 can be varied according to various conditions. As one of the position, size, and shape of the predetermined region 1300 is varied, visibility of the needle 830 can be increased and driver's concentration on the needle 830 can be induced.

The position of the predetermined region 1300 depends on the position of the needle 830. This is because the predetermined region 1300 is used to distinguish the needle 830 from information output on the display unit 820, thus increasing visibility of the needle 830. At least one of the size and shape of the predetermined region 1300 can be varied according to the speed and/or acceleration of the vehicle 100. For example, when the vehicle 100 is decelerating, the predetermined region 1300 has a first shape, and when the vehicle is accelerating, the predetermined region 1300 has a second shape different from the first shape.

Here, the size of each shape can be changed according to a degree of acceleration or deceleration, that is, acceleration. As the acceleration is increased, the size of the predetermined region 1300 can be increased, and as the acceleration is decreased, the size of the predetermined region 1300 can be reduced.

Further, a revolution per minute (RPM), the number of revolutions of an engine or a motor provided in the vehicle 100 per unit time can be calculated. The dashboard display 800 can output an RPM range, as well as a speed range, and includes a speed needle guiding a current speed and an RPM needle guiding a current RPM. The speed range and the RPM range are output to be spaced apart from each other, and thus, it may be slightly difficult to recognize the speed range and the RPM range at a glance.

The present disclosure provides the dashboard display 800 that can guide the current speed and the current RPM of the vehicle 100 by simply looking at the speed range.

Specifically, the processor 800 calculates a position of the predetermined region 1300 based on a position of the needle 830. The processor 800 also varies a size of the predetermined region 1300 based on the RPM of the vehicle 100. As the RPM decreases, the predetermined region 1300 can be reduced, and as the RPM increases, the predetermined region 1300 can be increased. Thus, the driver can intuitively recognize the current speed of the vehicle 100 and the current RPM by simply checking the needle placed in the speed range.

Instead of the RPM, the dashboard display 800 can guide an allowable driving speed range that can be accelerated or decelerated per unit time through the predetermined region 1300. Specifically, the processor 860 can calculate an allowable driving speed range that can be accelerated or decelerated per unit time based on the current speed of the vehicle 100 and characteristics of a road on which the vehicle 100 is driving. The allowable driving speed range includes a maximum acceleration speed and a maximum deceleration speed.

The allowable driving speed range is varied according to characteristics of the road on which the vehicle 100 is driving. For example, the maximum acceleration speed and the maximum deceleration speed decrease in an uphill road, and the maximum acceleration speed and the maximum deceleration speed increase in a downhill road. In another example, when driving on an unpaved road or desert sand or when driving in an expressway, the allowable driving speed range is changed even at the same speed.

In addition, the processor 860 sets the predetermined region 1300 based on the allowable driving speed range so that the allowable driving speed range can be guided. In other words, the size of the predetermined region 1300 can be adjusted according to the allowable driving speed range. In this instance, the driver can intuitively recognize through the predetermined region 1300 as to how much to accelerate or decelerate based on the current position.

In addition, the dashboard display 800 may further include an illumination sensor for sensing an illumination value. At least one of the size and shape of the predetermined region 1300 can be varied according to illumination values. For example, when driving at night, the predetermined region 1300 can have a first size, but when driving in the daytime, the predetermined region 1300 can have a second size smaller than the first size. This is because a large effect can be generated even with the predetermined region 1300 having a small size at night during which ambient light is less.

In another example, when solar light is introduced to the dashboard display 800, the visibility of the needle 830 can be degraded due to strong light. The dashboard display 800 can sense ambient light introduced to the display unit 820 using the illumination sensor and change at least one of the size and the shape of the predetermined region 1300 based on the sensed illumination value.

In addition, the dashboard display 800 can change a background image of the speed range. For example, when a sports mode is executed, a first background image corresponding to the sports mode can be output, and when an eco mode is executed, a second background image corresponding to the eco mode can be output. Since the size and shape are changed in each background image, the size and shape of the predetermined region 1300 that can optimize visibility of the driver can be changed according to background images of the speed range. The processor 860 can change at least one of the size and the shape of the predetermined region 1300 as the background image of the speed range is changed.

Figure 14A:
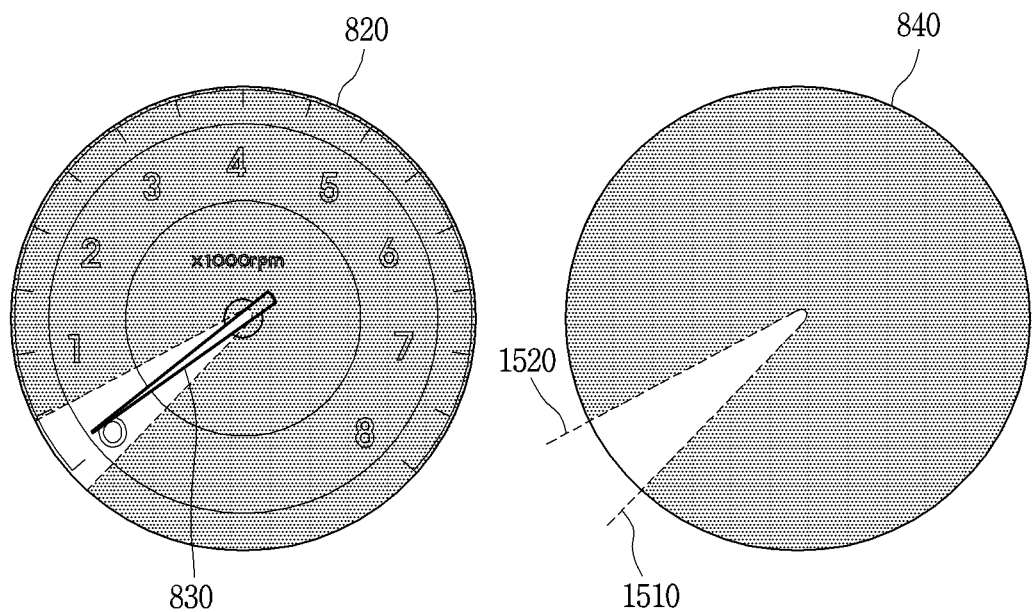
FIGS. 14A to 14C are views illustrating a dashboard display providing a dynamic interface using a predetermined region.
Figure 14B:
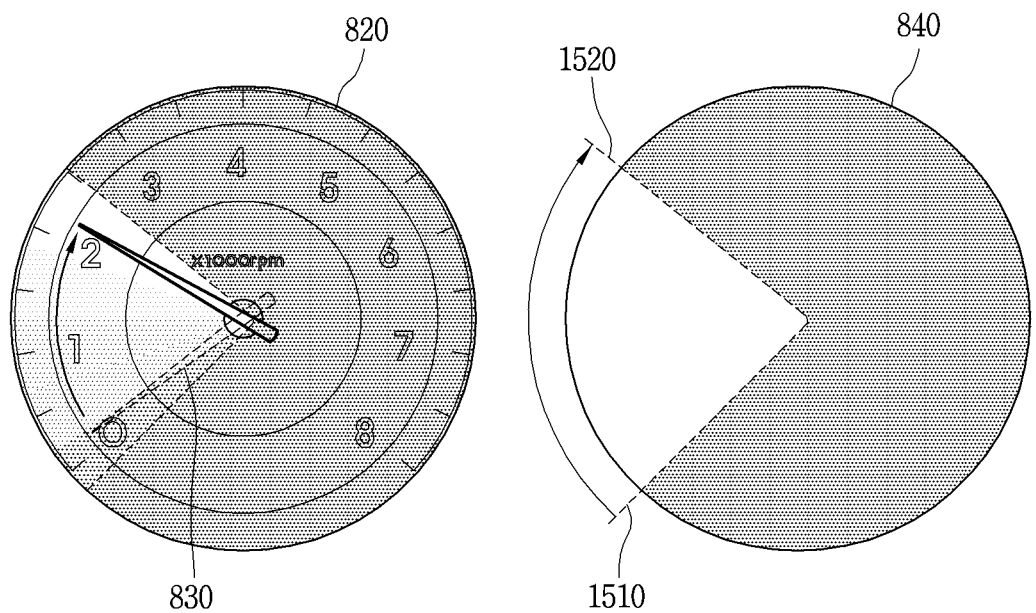
Figure 14C:
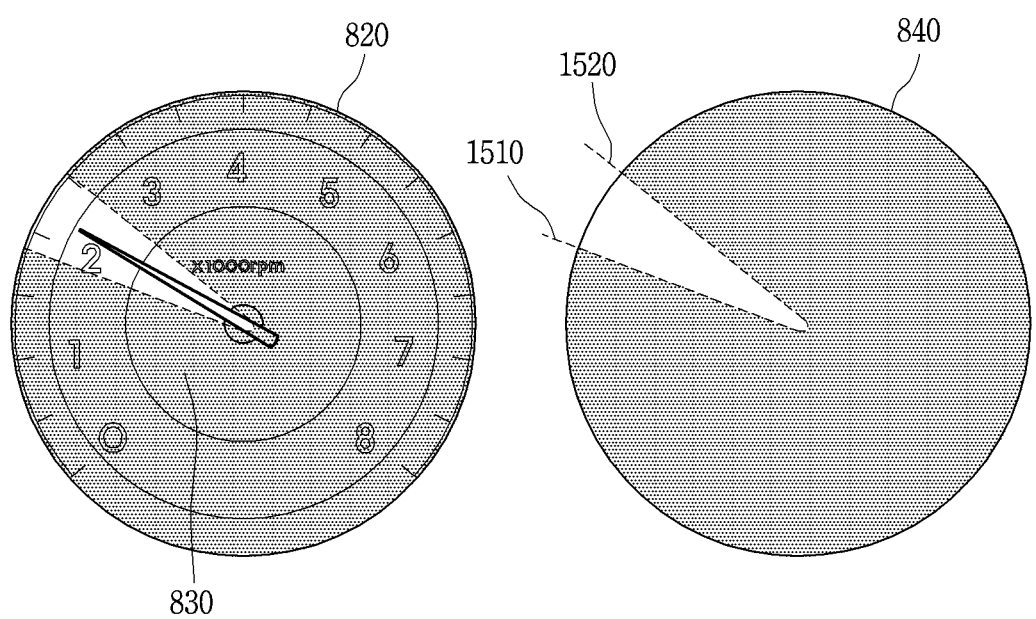

FIGS. 14A to 14C are views illustrating a dashboard display using a predetermined region to provide a dynamic interface. If the speed range is circular, the predetermined region 1300 can have a fan shape centered on a rotation axis of the needle 830. More specifically, the predetermined region 1300 can have a shape surrounded by a first radius based on a first speed point, a second radius based on a second speed point, and an arc therebetween.

When the vehicle 100 decelerates or accelerates, the processor 860 can vary the angle between a first radius 1510 and a second radius 1520 of the predetermined region 1300 according to a degree of deceleration or a degree of acceleration. That is, the processor 860 can adjust a size of the predetermined region 1300.

The case of acceleration will be described with reference to FIGS. 14A to 14C, as an example. When the vehicle 100 travels at a constant speed or travels within a predetermined range which can be considered as a constant velocity, the predetermined region 1300 can have a fan shape having a first angle as illustrated in FIG. 14A.

Thereafter, when the vehicle 100 starts to accelerate, the first radius 1510 is fixed and the second radius 1520 starts to move along the needle 830 as illustrated in FIG. 14B. That is, an included angle of the predetermined region 1300 starts to be varied.

When a predetermined time has lapsed after the first radius 1510 was fixed and the second radius 1520 started to move, the first radius 1510 starts to move. Here, the first radius 1510 can move as if it follows movement of the second radius 1520. Specifically, the first radius 1510 can be located at a position where the second radius 1520 was present at t-n seconds before n seconds as the predetermined time with respect to the current time t. In this instance, a movement speed of the first radius 1510 can follow the speed at which the second radius 1520 moves before a predetermined time, and can be varied according to the degree of acceleration.

Alternatively, the first radius 1510 can move as if it chases movement of the needle 830. In this instance, the first radius 1510 can be moved at a constant speed. The first radius 1510 can chase the second radius 1520 or the needle 830 and subsequently stop moving at a position at which an included angle with the second radius 1520 reaches the first angle as illustrated in FIG. 14C.

The driver can visually check how much acceleration has been performed during the predetermined time according to the belated movement by the predetermined time. For deceleration, the first radius 1510 starts to move when the second radius 1520 is fixed, and after the predetermined time has lapsed, the second radius 1520 can chase after the first radius 1510 or the needle 830.

Furthermore, the present disclosure can also be applicable to vehicles including the dashboard display according to one or more of the above-described embodiments. The present disclosure described above may be implemented as a computer-readable code (or application or software) in a medium on which a program is recorded. The method for controlling an autonomous vehicle may be realized by a code stored in a memory, or the like.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A dashboard display for a vehicle, the dashboard display comprising:
   a light source unit including a plurality of light sources disposed in a matrix form;
   a display unit disposed on the light source unit and configured to display speedometer information using light provided from the light source unit;
   a needle positioned on the speedometer information and rotatably moving according to a speed of the vehicle; and
   a processor configured to:
   determine a region at least partially surrounding the needle based on a position of the needle, wherein a shape of the region at least partially surrounding the needle is changed according to an acceleration of the vehicle,
   control the display unit to display an image of a predetermined color on the region at least partially surrounding the needle, and
   control the light source unit to emit a predetermined brightness in the region at least partially surrounding the needle such that a contrast of the image is varied.

2. The dashboard display of claim 1, wherein the processor is further configured to:
   individually control at least one of a brightness and an ON/OFF state of the light sources included in the light source unit, and
   control at least one of the light sources corresponding to the region at least partially surrounding the needle to have the predetermined brightness.

3. The dashboard display of claim 2, wherein the processor is further configured to:
   control the at least one of the light sources corresponding to the region at least partially surrounding the needle to output light having a first brightness and control other remaining light sources to output light having a second brightness.

4. The dashboard display of claim 2, wherein the processor is further configured to turn on light sources included in a first group and turn off light sources included in a second group of the light sources.

5. The dashboard display of claim 1, wherein the region at least partially surrounding the needle includes an edge region surrounding at least a portion of the needle.

6. The dashboard display of claim 1, wherein the region at least partially surrounding the needle includes a first region surrounding at least a portion of the needle and a second region surrounding at least a portion of the first region, and
   wherein the processor is further configured to control the light source unit such that the first region and the second region have different brightnesses.

7. The dashboard display of claim 6, wherein the second region has different display sizes according to different speeds of the vehicle.

8. The dashboard display of claim 1, wherein the processor is further configured to control the display unit to stop displaying at least a portion of the speedometer information.

9. The dashboard display of claim 8, wherein the processor is further configured to control the display unit to display an image having a predetermined color to the region at least partially surrounding the needle.

10. The dashboard display of claim 1, wherein the processor is further configured to control the light source unit to change at least one of a size and a shape of the region at least partially surrounding the needle according to an acceleration of the vehicle.

11. The dashboard display of claim 10, wherein when the vehicle is decelerating, the region at least partially surrounding the needle has a first shape, and when the vehicle is accelerating, the region at least partially surrounding the needle has a second shape different from the first shape.

12. The dashboard display of claim 1, further comprising:
    an illumination sensor configured to sense an illumination value,
    wherein the processor is further configured to change at least one of a size and a shape of the region at least partially surrounding the needle according to the illumination value.

13. The dashboard display of claim 1, wherein the display unit includes a hollow portion, and the needle rotatably moves according to a rotation of a rotational shaft penetrating through the hollow portion.

14. The dashboard display of claim 1, wherein the needle is a graphic object displayed by the display unit.

15. The dashboard display of claim 1, wherein the processor is further configured to:
    calculate an allowable driving speed range in which a driving speed is accelerated or decelerated per unit time, and
    set the region at least partially surrounding the needle based on the allowable driving speed range.

16. The dashboard display of claim 15, wherein the processor is further configured to vary the allowable driving speed range according to characteristics of a road on which the vehicle is driving.

17. A method of controlling a dashboard display for a vehicle, the method comprising:

displaying, via a display unit of the dashboard display, speedometer information using light provided from a light source unit including a plurality of light sources disposed in a matrix form;

sensing, via a processor of the dashboard display, a needle positioned on the speedometer information and rotatably moving according to a speed of the vehicle;

determining, via the processor, a region at least partially surrounding the needle based on a position of the needle, wherein a shape of the region at least partially surrounding the needle is changed according to an acceleration of the vehicle;

displaying, via the display unit, an image of a predetermined color on the region at least partially surrounding the needle; and controlling, via the processor, the light source unit to emit a predetermined brightness in the region at least partially surrounding the needle such that a contrast of the image is varied.

18. The method of claim 17, further comprising:

individually controlling at least one of a brightness and an ON/OFF state of the light sources included in the light source unit; and controlling at least one of the light sources corresponding to the region at least partially surrounding the needle to have the predetermined brightness.

19. The method of claim 18, further comprising:

controlling the at least one of the light sources corresponding to the region at least partially surrounding the needle to output light having a first brightness and control other remaining light sources to output light having a second brightness.

20. The method of claim 18, further comprising:

turning on light sources included in a first group and turn off light sources included in a second group of the light sources.

* * * * *